United States Patent Office 3,474,823
Patented Oct. 28, 1969

3,474,823
AUTOMATIC CONTROLLER FOR EVACUATION AND PURGING OF INTERCHANGE CHAMBER ON CONTROLLED ENVIRONMENT BOX
Lloyd Taylor Finlayson, Midland, and Hazen V. Doan, Auburn, Mich., assignors to The Dow Chemical Company, Midland, Mich., a corporation of Delaware
Filed Dec. 21, 1967, Ser. No. 692,588
Int. Cl. G04c *23/00;* G05b *19/00;* C06b *21/02*
U.S. Cl. 137—554                                  4 Claims

ABSTRACT OF THE DISCLOSURE

The present invention relates generally to a controlled environment box, and, more specifically it relates to a novel electrical apparatus for automatically controlling evacuation and purging of an interchange chamber on a controlled environment box (generally referred to as a "dry box").

---

One of the principal uses of a controlled environment box, which is generally referred to in the art as a "dry box," is in the preparation of so-called pyrophoric compounds. Compounds of this type, which might be characterized, for example, by various hydridies, such as sodium, aluminum and lithium hydrides, will spontaneously ignite when exposed to oxygen and moisture present in the surrounding atmosphere. In the preparation of such compounds, therefore, the reaction is generally condutced in a closed system, such as a controlled environment box ("dry box"), in which the environment consists principally of an oxygen and moisture-free, chemically-inert gas such as nitrogen, argon, helium, or the like. To assure a substantially "dry" environment for reaction of the pyrophoric compounds, that is, an environment relatively free of oxygen and moisture, the reactant materials are brought into the controlled environment box through an interchange chamber mounted on one side of the box, which has an inside door on one end opening into the box itself and an outside door on the opposite end opening to the surrounding atmosphere. To prevent contamination of the box environment with oxygen and moisture, the inside door is kept tightly closed while the reactant materials are placed in the interchange chamber through the outside door. The outside door is then closed tightly and the atmosphere in the interchange chamber is first evacuated and then purged, with the same type of inert gas as used in the environment box being used for the purge gas. The evacuation and purge cycle must generally be repeated several times to attain a desirably low oxygen and moisture level in the interchange environment. Once the interchange chamber is relatively free of oxygen and moisture, the inside door of the chamber is opened and the reactant materials are transferred from the interchange into the environment box. As those skilled in the art are well aware, several value manipulations, as well as visual observations of pressure sensing apparatus (such as mercury manometers), are required to effect the desired evacuation and purging of the interchange chamber. Since the entire evacuation and purge operation has heretofore been done manually, the operation has required the constant attention of a skilled technician and a considerable amount of his time. To provide an automated system for effecting evacuation and purging of the interchange, therefore, would be highly desirable from the standpoint of operating efficiency in a controlled environment box.

Accordingly, it is a principal object of this invention to provide an electrical system for automatically effecting evacuation and purging of the interchange chamber in a controlled environment box.

Another object of the invention is to provide an electrical system for automatically effecting evacuation and purging of the interchange chamber on a controlled environment box in which said system will terminate the evacuation and purge operation upon completion of a predetermined number of cycles.

Another object of this invention is to provide an electrical system for automatically effecting evacuation and purging of an interchange chamber on a controlled atmosphere box wherein said system has means incorporated therein for visibly indicating a given sequence in the evacuation and purge cycle.

Other objects and advantages of this invention will be apparent from reference to the following description taken in conjunction with the accompanying drawings, in which.

Figure 1:
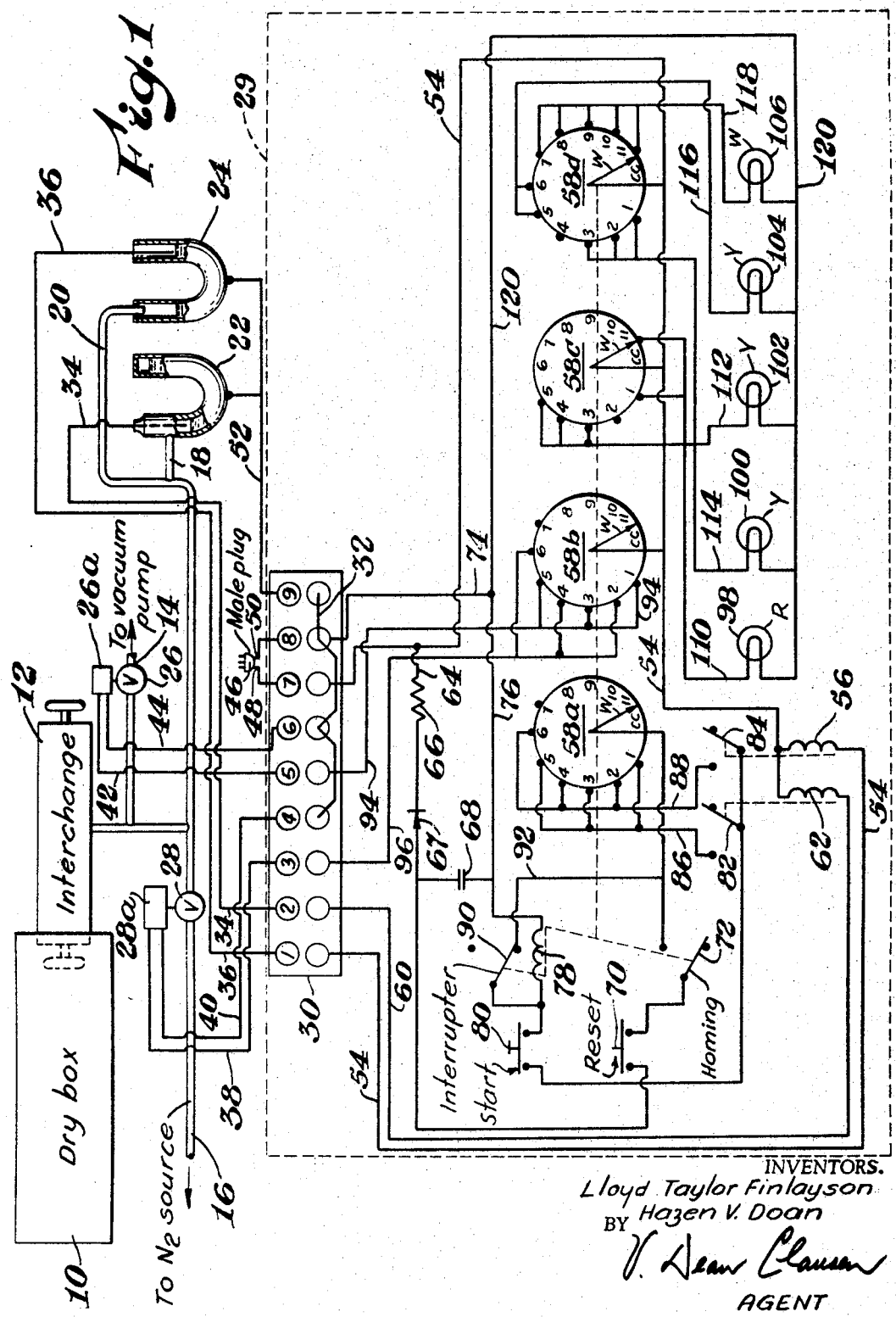
FIG. 1 is a schematic wiring diagram of a preferred electrical system for automatically effecting evacuation and purging of an interchange chamber on a controlled environment box.

Briefly stated, the present invention contemplates an electrical system for automatically controlling evacuation and purging of the interchange chamber on a controlled environment box. The evacuation-purge cycle is initiated by pumping the interchange chamber down to a near vacuum (ideally, not more than about 1–2 mm. Hg), as determined by a pressure line linking the interchange chamber to one leg of a conventional U-shaped mercury manometer. The manometer is partially filled with mercury and the ends of both legs are closed in order to seal them off from the outside atmosphere. Once the mercury in the leg of the manometer connected to the pressure line reaches the desired "vacuum condition" level, it makes contact with a sensing wire installed in this same leg, which is immersed in the mercury on one end and connected to a relay stepping switch unit at its opposite end. In this manner the manometer acts as a mercury switch to actuate the relay, which closes a solenoid-actuated valve in a vacuum line connecting the interchange chamber with a vacuum pump. Simultaneously, the relay-stepping switch unit opens a solenoid-actuated valve in a purge line connecting the interchange chamber to a source of inert gas (preferably nitrogen). Once the purge gas level in the interchange chamber reaches substantially the same pressure as the surrounding atmosphere, as determined by transmission of the pressure through a line connecting the interchange chamber to one leg of a similar U-shaped mercury manometer, which is closed, the mercury in the closed leg of the manometer equalizes with the height of the mercury in the opposite leg of the manometer, which is open to the atmosphere. At this point, a sensing wire installed in the open leg of the manometer and connected to the relay-stepping switch unit makes contact with the mercury to actuate the relay-stepping switch mechanism, which closes the solenoid-actuated valve in the purge line and, simultaneously, opens the solenoid actuated valve in the vacuum line. In this manner, therefore, the interchange chamber may be evacuated and purged automatically for as many cycles as is required to attain the desired low oxygen-moisture environment in the chamber. According to the embodiment illustrated herein, the interchange chamber is evacuated and purged through three separate cycles. It will be understood, however, that the electrical system may be readily modified within the scope of this invention to provide for several additional cycles as desired. The preferred electrical system of this invention also includes a battery of indicator lights, which operate in conjunction with the stepping switch to provide a convenient visual means for readily determining a given sequence in the evacuation and purge cycle.

A better understanding of the present invention may be gained from the following description taken in conjunction with the accompanying drawings. The drawings illustrates only one of numerous embodiments within the scope of this invention and the form shown is selected for the purpose of convenient illustration and clear demonstration of the principles involved. Corresponding parts of the illustrated embodiment are designated with the same reference numerals, with suffixes being applied where appropriate.

GENERAL DESCRIPTION

Referring to the drawing, and particularly to FIG. 1, numeral 10 refers generally to a conventional controlled environment box (commonly referred to as a "dry box"). Mounted on one side of box 10 is an interchange chamber 12, which comprises a generally cylindrical chamber having an inner door on one end opening into box 10 and an outside door on the opposite end which opens to the surrouding atmosphere. The doors on chamber 12, which operate independently of each other are hingeably mounted on the chamber and each door is equipped with a wheel-type latch or other suitable mechanism to provide an air-tight seal when the door is closed. Fitted into and extending from the side wall of chamber 12 is a length of small diameter tubing (such as ¼-in. OD copper) having several branches therein which connect the chamber to a vacuum pump (not shown), a nitrogen cylinder (not shown), a vacuum indicator means and an atmospheric indicator means. More specifically, a first branch is connected to a vacuum pump to define vacuum line 14. A second branch is connected to a nitrogen cylinder to define purge line 16. A third branch is connected to one leg of a standard U-shaped mercury manometer 22 to define vacuum indicator line 18. A fourth branch is connected to the closed leg of a similar U-shaped mercury manometer 24 to define an atmospheric pressure indicator line 20. For controlling evacuation of chamber 12 a valve 26 operated by solenoid 26a is installed in vacuum line 14. Purging of chamber 12 is controlled by a valve 28 and a solenoid 28a installed in purge line 16.

Evacuation-purge cycle circuitry

Figure 2:
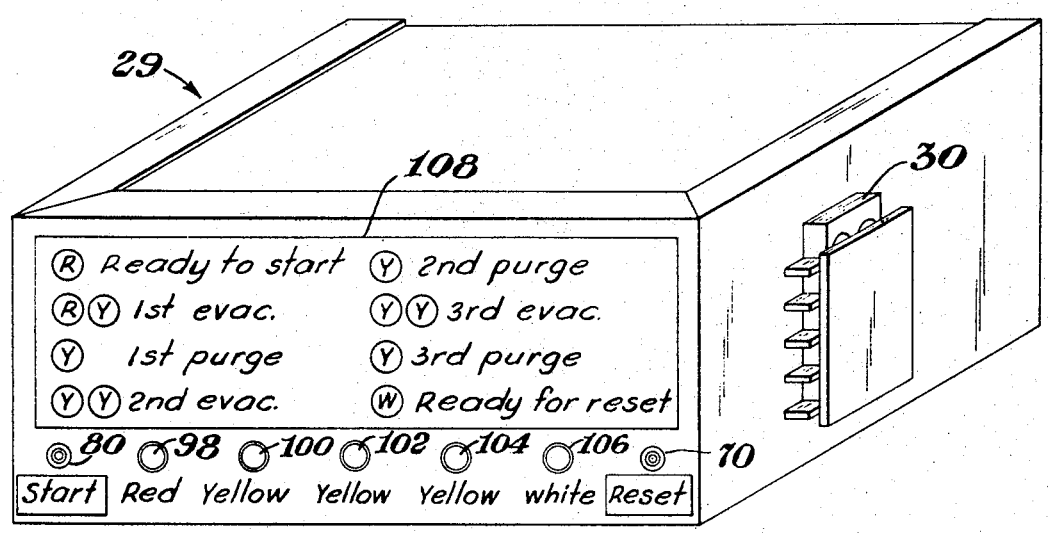
FIG. 2 is an oblique view of a control box which houses the electrical system shown in FIG. 1. The front elevational view of FIG. 2 illustrates a battery of indicator lights which form a part of the eletcrical system shown in FIG. 1.

The various components in the electrical system of this invention are housed in a control box 29 as shown in FIG. 2 and indicated generally in broken outline in FIG. 1. A terminal strip 30 with nine (9) terminal posts thereon is mounted at one end of control box 29 to provide a distribution panel for the various electrical leads in the system. A neutral line 32, which links terminals 4, 6, 8 and 9 on strip 30, provides the required neutral connection for the circuit. A sensing lead 34 connects terminal post 2 with one leg of manometer 22, while a similar sensing lead 36 connects terminal 1 with the open leg of manometer 24. Solenoid 28a is connected to terminal post 3 through lead 38 and is returned to terminal 4 through neutral connection 40. Solenoid 26a is connected to terminal 5 through lead 42 and is returned to terminal 6 through neutral connection 44. Terminal strip 30 is connected to a conventional 110 v. AC current supply male plug 46 which is connected to terminal 7 through lead 48 and is returned to terminal 8 through neutral connection 50. Manometers 22 and 24 are returned to strip 30 at terminal 9 through neutral connection 52.

In general, the evacuation and purging of interchange chamber 12 is effected by a first manometer 24 and a second manometer 22 which operate in conjunction with a rotary stepping switch 58 and various other switches and relay coils to control solenoid-actuated valves 26a and 28a in vacuum line 14 and purge line 16, respectively. Stepping switch 58 consists of a bank of four (4) decks indicated by reference numerals 58A, 58B, 58C and 58D, respectively, together with a relay coil 78, an interrupter switch 90 and a homing switch 72. Each deck of stepping switch 58 has eleven (11) contact positions thereon (numbered 1 to 11, respectively) which are swept by a wiper arm W linked to a central contact arm CC on each deck. Connection of manometer 24 to the electrical system herein is provided by a lead 54 which links terminal 1 with relay coil 56 and connection CC of decks 58B, 58C and 58D and to the power side of plug 46, that is, at terminal 7 on strip 30. Connection of manometer 22 is provided by lead 60 which links terminal 2 with relay coil 62 which is in turn connected to lead 54 at relay 56. One side of a circuit connecting manometers 22 and 24 to stepping switch 58 is provided by a lead 64 which ties into lead 54 and passes through a resistor 66, a rectifier 67, one side of a capacitor 68, a reset switch 70 (pushbutton momentary contact switch), a homing switch 72 and connects to central contact CC of deck 58A. The opposite side of this circuit is linked to neutral terminal 8 of strip 30 by a main lead 74 which ties into a branch lead 76, which in turn connects to the opposite side of capacitor 68, through relay coil 78, start switch 80 (pushbutton momentary contact switch) and through switches 82 and 84. Since relay coil 78 is designed for operation with DC current only, resistor 66 and rectifier 67, convert the 110 v. AC current supplied to the system to DC current before it enters relay 78. Switch 82 links lead 76 with contacts 1, 3 and 5 of deck 58A through lead 86, while switch 84 links lead 76 with contacts 2, 4 and 6 of deck 58A through lead 88. Advancing of stepping switch 58 through its various contact positions is provided by interrupter switch 90 in lead 92 which connects across lead 76 from relay 78 to central contact CC of deck 58A.

Actuation of the solenoids which open and close valves 26 and 28 to effect evacuation and purging of the interchange chamber, is controlled from deck 58B of stepping switch 58. The three evacuation sequences of this invention are initiated by contact of wiper arm W with contacts 1, 3 and 5 of deck 58B, which are linked to solenoid 26a on valve 26 through lead 94 connected to terminal 5. The three purge sequences are initiated by contact of wiper arm W with contacts 2, 4 and 6 of deck 58B, which are linked to solenoid 28a on valve 28 through lead 96 connected to terminal 3.

The evacuation-purge electrical system of this invention also includes a battery of colored lights mounted on the front panel of control box 29, as a convenient visual means for readily indicating a given sequence in the evacuation and purge cycle. The battery of lights in this system comprise a red light 98, three yellow lights 100, 102 and 104 and a white light 106. An identification tag 108 mounted above the light battery on control box 29 contains an appropriate legend which matches a particular sequence in the evacuation-purge cycle to its corresponding light signal. The lights in this system are connected to various contact points on decks 58C and 58D of the stepping switch and are actuated by contact of the respective wiper arms W with the appropriate contact points. For example, one side of the circuit for red light 98 is provided by lead 110 which connects light 98 to contacts 11 and 1 on deck 58C. One side of the circuit for yellow light 102 is provided by lead 112 which connects light 102 to contacts 3, 4 and 5 on deck 58C. One side of the circuit for yellow light 100 is provided by lead 114 which connects light 100 with contacts 1, 2, and 3 on deck 58D. One side of the circuit for yellow light 104 is provided by lead 116 which connects light 104 to contacts 5 and 6 on deck 58D. One side of the circuit for white light 106 is provided by lead 118 which connects light 106 to contacts 7, 8, 9, 10 and 11 on deck 58D. The opposite or neutral side of the light circuit is provided by branch lead 120 which connects to each light and in turn ties into main lead 74 connected to ground terminal 8 on strip 30.

Operation of evacuation-purge control apparatus

As stated hereinbefore, the principal purpose of a controlled environment box (or so-called "dry box") is to provide a suitable environment for synthesis of various materials, such as certain hydrides, which cannot be reacted in a general room atmosphere since they will "flash off" and rapidly decompose when exposed to the oxygen and moisture present in such an atmosphere. The atmosphere in the "dry box" is generally a chemically-inert gas, such as nitrogen, in which the atmospheric oxygen content is not more than about 10 p.p.m., to provide the desired environment for the reaction. To keep from contaminating the "dry box" environment with oxygen from the outside atmosphere, therefore, the reactant materials are first placed in an interchange chamber, which is associated with but sealed off from the "dry box" itself and the outside atmosphere. The interchange chamber is then evacuated (pumped down) and purged with the same type of inert gas as employed in the "dry box." The evacuation and purge cycle is repeated a sufficient number of times to attain substantially the same environment as the "dry box." The interchange door into the "dry box" is then opened to transfer the reactant materials into the controlled environment, with the outside door of the interchange chamber being kept tightly closed during the transfer operation.

At the commencement of a typical evacuation-purge cycle according to the practice of this invention, interchange chamber 12 is closed off from the "dry box" and from the outside atmosphere, and is therefore ready for evacuation. The evacuation sequence is initiated by throwing a switch to start a vacuum pump (not shown) in vacuum line 14 in a conventional manner. Once the vacuum pump is started, push button switch 80 is momentarily closed to complete a circuit to relay coil 78 and thereby energize the relay. Switch 80 is then immediately released to open the circuit and de-energize relay 78, which advances wiper arms W on all decks of stepping switch 58 from their "rest" position at contact 11 to contact 1 (first evacuation sequence). A circuit is thus completed from contact 1 of deck 58B to solenoid 26a which opens valve 26 in vacuum line 14. When the atmosphere in chamber 12 is substantially evacuated, the mercury in the leg of manometer 22 which is linked to vacuum indicator line 18, makes contact with sensing wire 34 to complete a circuit to relay 62. Relay 62 is thus energized to close switch 82 and energize relay 78, which opens interrupter switch 90 to de-energize relay 78 and advance wiper arms W on all decks of stepping switch 58 from contact 1 to contact 2 (first purge sequence). Advancement of wiper arm W to contact 2 of deck 58B completes a circuit from this contact to solenoid 28a, which opens valve 28 in purge line 16 to allow a nitrogen purge gas to flow into chamber 12. When the amount of nitrogen purge gas released into chamber 12 reaches atmospheric pressure, the height of the mercury in the open leg of manometer 24 will be about equal to the height of the mercury in the closed leg of the manometer, due to the substantially equal pressure being exerted on each mercury column. At this point the mercury in the open leg of manometer 24 makes contact with sensing wire 36 which completes a circuit to relay 56. Relay 56 is thus energized to close switch 84 and energize relay 78, which opens interrupter switch 90 to de-energize relay 78 and advance wiper arms W on all decks of stepping switch 58 from contact 2 to contact 3 (second evacuation sequence). At contact position 3, stepping switch 58 merely repeats the operation performed at contact position 1, thereby completing the second evacuation sequence and thus advancing to contact position 4. At contact position 4, stepping switch 58 repeats the operation performed at contact position 2 to complete the second purge sequence and advance to contact position 5. Contact position 5 is a repeat of the operation at positions 1 and 3 to complete the third evacuation sequence. Stepping switch 58 then advances to contact position 6, which repeats the operation performed at positions 2 and 4 to complete the third purge sequence.

After completion of the third and final purge sequence, stepping switch 58 advances to contact position 7, which is a neutral contact point. At neutral contact point 7 the evacuation-purge cycle is terminated and stepping switch 58 will remain on contact 7, that is, in a "rest" position, until it is desired to reset stepping switch 58 in preparation for another evacuation-purge cycle. The reset sequence is initiated by momentarily closing push button switch 70, which closes homing switch 72, energizes relay 78 and opens interrupter switch 90, which de-energizes relay 78 and advances all decks of stepping switch 58 to neutral contact position 8. The same operation is continuously repeated to advance stepping switch 58 from neutral contact 8 through neutral contacts 9 and 10 and on to neutral contact 11, at which point the opening of homing switch 72 by de-energization of relay 78 breaks the reset circuit. At completion of the reset sequence, therefore, wiper arms W on each deck of stepping switch 58 rest on neutral contact 11, until the stepping switch is again advanced to contact position 1 by manually pressing switch 80 at the start of another evacuation-purge cycle.

As mentioned hereinbefore, a battery of indicator lights mounted on the front panel of control box 29, which operate in conjunction with stepping switch 58, provide a convenient visual means by which the operator can see at a glance the particular sequence or stage in which the evacuation-purge cycle may be at any time. The indicator lights in the electrical system of this invention comprise a battery of five (5) lights, designated as red light 98, yellow light 100, yellow light 102, yellow light 104 and white light 106. As will be clear from the wiring diagram of FIG. 1 and from the legend as shown on identification tag 108 in FIG. 2, red light 98 will be "on" when wiper arm W on deck 58C is in contact with neutral position 11, to indicate that the reset sequence has been completed and the system is ready for starting the first evacuation sequence. During the first evacuation sequence, when the wiper arms of decks 58C and 58D are in contact with position 1, red light 98 will remain "on" and yellow light 100 will also come "on." During the first purge sequence, when the wiper arm of deck 58D advances to contact position 2, red light 98 will go off and yellow light 100 will remain "on." During the second evacuation sequence, when the wiper arms of decks 58C and 58D advances to contact position 3, yellow light 100 will remain "on" and yellow light 102 will also come "on." During the second purge sequence, when the wiper arm on deck 58C advances to contact position 4, yellow light 100 will go off and yellow light 102 will remain "on." During the third evacuation sequence, when the wiper arms on decks 58C and 58D advance to contact position 5, yellow light 102 will remain "on" and yellow light 104 will also come "on." During the third purge sequence, when the wiper arm on deck 58D advances to contact position 6, yellow light 102 will go off and yellow light 104 will remain "on." When the third and final purge is complete and the wiper arm on deck 58D advances to neutral contact position 7, yellow light 104 will go off and white light 106 will come "on," indicating that the evacuation-purge cycle has been terminated and the system is ready for resetting. White light 106 will remain "on" during the entire reset sequence, that is, during advancement of the wiper arm on deck 58D through contact positions 8, 9 and 10. When the wiper arm on deck 58D reaches contact position 11, white light 106 will go off and red light 98 will again come "on," to indicate that the system is ready for starting the first evacuation sequence.

Although the electrical apparatus of this invention is particularly adapted for automatically controlling evacuation and purging of an interchange chamber on a controlled environment box, it is contemplated that this apparatus would be useful in any type of automated operation where it is desired to complete a given step in a series before progressing to the next step, and further, to terminate an operation after a predetermined series of steps have been completed.

What is claimed is:

1. Apparatus for automatically controlling evacuation and purging of an interchange chamber on a controlled environment box and for terminating the evacuation-purge operation after a predetermined number of cycles have been completed, which includes, a purge line connecting the interchange chamber with a source of purge gas, a first solenoid-actuated valve and a first manometer for indicating a condition of atmospheric pressure in the interchange chamber;

a vacuum line connecting the interchange chamber with a vacuum pump, a second solenoid-actuated valve and a second manometer for indicating a condition of substantially vacuum pressure in the interchange chamber;

the atmospheric pressure indicating first manometer having a first sensing means associated therewith and connected to a stepping switch which is connected to the first solenoid-actuated valve in the purge line;

the vacuum indicating second manometer having a second sensing means associated therewith and connected to the stepping switch which is connected to the second solenoid-actuated valve in the vacuum line; whereby the first sensing means will respond to a condition of atmospheric pressure in the interchange chamber to actuate the stepping switch to close the first solenoid-actuated valve in the purge line and open the second solenoid-actuated valve in the vacuum line to allow the vacuum pump to evacuate the interchange chamber;

the second sensing means will respond to a condition of substantially vacuum pressure in the interchange chamber to actuate the stepping switch to close the second solenoid-actuated valve in the vacuum line and open the first solenoid-actuated valve in the purge line to allow release of purge gas into the interchange chamber; and upon completion of the final purge sequence in a predetermined number of evacuation-purge cycles, the stepping switch will advance to a neutral contact position and lie at rest to terminate the operation.

2. The apparatus of claim 1 which includes a first U-shaped manometer having one closed leg and one leg open to the outside atmosphere, said manometer being partially filled with mercury and having a sensing wire encased in the open leg, said sensing wire being positioned such that it will contact the mercury in the manometer and thus actuate the stepping switch when a condition of atmospheric pressure is reached in the interchange chamber.

3. The apparatus of claim 1 which includes a second U-shaped manometer having closed legs, said manometer being partially filled with mercury and having a sensing wire encased in one leg of the manometer, said sensing wire being positioned such that it will contact the mercury in the manometer and thus actuate the stepping switch when a condition of substantially vacuum pressure is reached in the interchange chamber.

4. Apparatus for automatically controlling evacuation and purging of an interchange chamber on a controlled environment box and for terminating the evacuation-purge operation after a predetermined number of cycles have been completed, which includes, a purge line connecting the interchange chamber with a source of purge gas, a first solenoid-actuated valve and a first manometer for indicating a condition of atmospheric pressure in the interchange chamber;

a vacuum line connecting the interchange chamber with a vacuum pump, a second solenoid-actuated valve and a second manometer for indicating a condition of substantially vacuum pressure in the interchange chamber;

the atmospheric pressure indicating first manometer having a first sensing means associated therewith and connected to a stepping switch which is connected to the first solenoid-actuated valve in the purge line;

the vacuum indicating second manometer having a second sensing means associated therewith and connected to the stepping switch, which is connected to the first solenoid-actuated valve in the vacuum line;

a battery of colored indicator lights also being connected to the stepping switch; whereby the first sensing means will respond to a condition of atmospheric pressure in the interchange chamber to actuate the stepping switch to close the first solenoid-actuated valve in the purge line and open the second solenoid-actuated valve in the vacuum line to allow evacuation of the interchange chamber by the vacuum pump;

the second sensing means will respond to a condition of substantially vacuum pressure in the interchange chamber to actuate the stepping switch to close the second solenoid-actuated valve in the vacuum line and open the first solenoid-actuated valve in the purge line to allow release of purge gas into the interchange chamber; and upon completion of the final purge sequence in a predetermined number of evacuation-purge cycles, the stepping switch will advance to a neutral contact position; and during each evacuation and purge sequence and upon completion of the final purge sequence in the evacuation-purge cycle certain lights in the battery of colored indicator lights will respond to actuation by the stepping switch to provide visual means for determining a given sequence in the evacuation-purge cycle.

References Cited

UNITED STATES PATENTS

| | | | |
|---|---|---|---|
| 2,987,711 | 6/1961 | Palmer | 340—213 |
| 2,989,667 | 6/1961 | Swink | 317—142 |
| 3,103,347 | 9/1963 | Fath et al. | 137—554 XR |
| 3,205,049 | 9/1965 | Lannert et al. | 23—281 |
| 3,349,840 | 10/1967 | Tope et al. | 137—554 XR |

HENRY T. KLINKSIEK, Primary Examiner

U.S. Cl. X.R.

23—281